United States Patent [19]

Jones

[11] 3,871,443

[45] Mar. 18, 1975

[54] SAFETY CONTROL FOR A REMOTE CONTROL SYSTEM

[75] Inventor: Allen G. Jones, Baltimore, Md.

[73] Assignee: General Electric Company, Louisville, Ky.

[22] Filed: Apr. 17, 1974

[21] Appl. No.: 461,535

[52] U.S. Cl............. 165/11, 165/12, 165/22, 62/130, 236/1 B
[51] Int. Cl............................. F24f 13/00
[58] Field of Search........... 165/11, 12, 22; 62/130; 236/1 B; 219/341, 358

[56] References Cited
UNITED STATES PATENTS

| | | |
|---|---|---|
| 2,761,950 | 9/1956 | Tagliaferri et al.......... 219/358 |
| 3,260,899 | 7/1966 | Green..................... 236/1 B |
| 3,422,249 | 1/1969 | Grossinger................ 219/341 |
| 3,450,343 | 6/1969 | Donath.................... 165/12 |

Primary Examiner—Charles Sukalo

[57] ABSTRACT

Safety control apparatus including a remote system for turning a zone heating and cooling air conditioning unit on and off from a central control point and a safety freeze control system for simultaneously switching the unit from a normal operating mode to a heating mode at a predetermined temperature and overriding the remote control system.

8 Claims, 2 Drawing Figures

PATENTED MAR 18 1975 3,871,443

3,871,443

SAFETY CONTROL FOR A REMOTE CONTROL SYSTEM

BACKGROUND OF THE INVENTION

1. Field of the Invention

In the installation of a plurality of air cooling and heating units such as at motels, apartments, and office buildings where individual units are used for the various zones requiring cooling or heating, remote controls have been provided wherein any one or a plurality of the units may be selectively rendered inoperative from a central control station. This ability to render zone units inoperative from a remote point is a desirable feature, especially when a zone is not occupied. A further feature provided in zone units has been a low temperature or safety freeze control wherein the zone unit rendered inoperative from a remote point is automatically placed in a heat mode in the event the zone area temperature drops below a critical predetermined low temperature, which might cause damage in that particular zone such as frozen plumbing. In order to place the unit in the heat mode it is necessary in systems provided with safety freeze control that it override the central control system when the zone temperatures drop below the predetermined level considered to be critical.

2. Description of the Prior Art

However, when freeze protection systems have been employed together with remote control systems they have traditionally employed one temperature responsive device to override the central control and a separate temperature responsive device to place the unit into a heat mode. In such installations where more than one temperature responsive device is employed in a particular zone the opening and closing temperatures of these devices may be and usually are different so that while one temperature responsive device may override the central control unit the zone unit controls may be in an undesirable mode, and the second thermostat device placing the zone unit controls in the heat mode may be delayed an undesirable amount of time. It is therefore an object of the present invention to provide a temperature responsive control device that will override the central control to place the unit back into communication with the power source while simultaneously switching the zone unit controls from a normal operating mode to a heat or safety mode to provide heater and fan operation through a single temperature responsive device.

SUMMARY OF THE INVENTION

The present invention is particularly directed to an improved safety control apparatus for a remotely controlled air conditioning zone unit which is provided with a heating and cooling system regulated by a zone thermostat. The zone unit is provided with a mode control system which is operable to condition the unit to operate either in a normal heating or cooling operating mode under control of the zone thermostat or in a safety heating operating mode under control of a safety thermostat. The zone unit has associated therewith a remote control input system operable from a remote or central source for turning the unit on and off. The safety thermostat is responsive to a predetermined low or critical temperature and simultaneously conditions the mode control system to switch the unit from a normal operating mode to a safety heating mode while overriding the remote control system to insure operation of the unit independent of the remote control system.

DESCRIPTION OF THE PREFERRED EMBODIMENT

Figure 1:
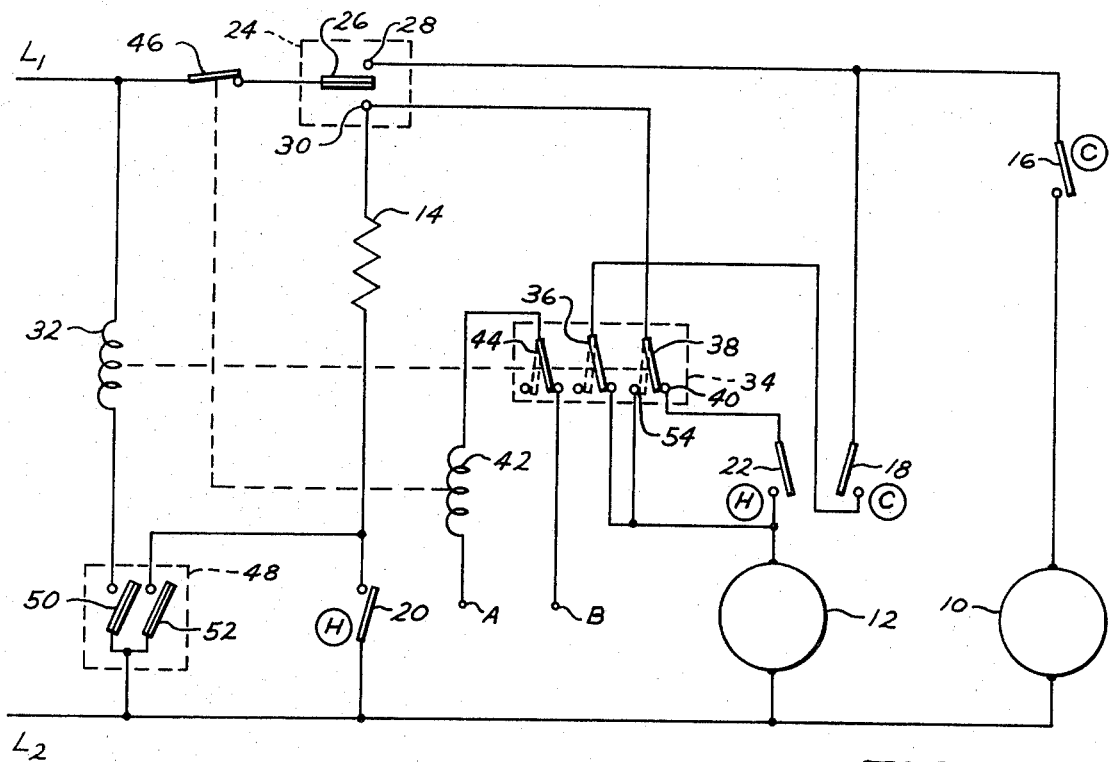
FIG. 1 is a schematic diagram of a control circuit of one embodiment of the present invention.

The circuitry of the present invention as shown in FIG. 1 is designed to control, from a pair of power supply lines $L_1$ and $L_2$, the operation of a combination refrigeration cooling and electrical heating system of a zone air conditioning unit. The refrigeration system is of the usual type including a compressor 10, a condenser and an evaporator (not shown) in closed series connection. An indoor fan 12 circulates enclosure or indoor air over a cooling evaporator and electric heater 14.

Manual control of the operation of this cooling and heating system is provided in the form of a manual switch comprising a plurality of mechanically connected switches adapted to operate the components of the apparatus in either the cooling mode or in the heating mode. These switches include a compressor switch 16, a fan cooling switch 18, a heating switch 20, and a fan heating switch 22. All of these switches are illustrated in their off or open position with the circulated letters H or C adjacent each of the switches indicating those switches which are closed manually for the heating or cooling modes. The components of the system are under control of a thermostat 24 located in the zone or area to be conditioned. The thermostat 24 includes a temperature responsive means 26 having a cooling contact 28 and a heating contact 30.

In the present embodiment a mode control system is provided which includes a relay 32 and an associated switch 34. The function of the mode control system and switch 34 will hereinafter be described in detail. The switch 34 includes a switch 36 in series with cooling switch 18 and a switch 38 having a contact 40 in series with heating switch 22. Generally with the zone requiring cooling and the thermostat switch in contact with 28 a circuit is completed from $L_1$ through the thermostat contact 28, switch 16, compressor 10 to line $L_2$ and through cooling switch 18, switch 36, fan 12 to $L_2$. When the thermostat 24 is in its heat position a circuit is completed from line $L_1$ through contact 30, electric heater 14, heat switch 20 to line $L_2$ and through switch 38, contact 40, heat switch 22, fan 12 to line $L_2$.

The present control system includes a remote control input means that is employed to turn zone units used in hotels, motels and offices or similar installations on and off. Individual zone units in unoccupied rooms or areas may be turned on and off from a main desk or central point by the remote control input means which in the present embodiment includes a relay 42 and associated switch 46 located in the supply line $L_1$. To disconnect the individual unit from the power source a switch (not shown) is closed at the central point to supply a low voltage across lines A and B, which will energize relay 42. As seen in FIG. 1, relay 42 is in series with a normally closed switch 44 in the mode switch 34. The energization of relay 42 causes its associated normally closed switch 46 located on supply line $L_1$ to open thereby turning the zone unit off from the remote location or central point. While disabling or turning off the unit from a remote location is desirable, the unit is rendered inoperable and as a result is not responsive to the zone thermostat. It should be apparent therefore that damage may occur to plumbing in the event the temperature in the unprotected zone goes below freezing.

To this end a safety freeze control thermostat 48 is provided which will operate to simultaneously override the remote control system and automatically through mode control relay 32 and its switch 34 place the unit in the heat mode. The safety thermostat 48 in the present embodiment is calibrated to close at a predetermined low temperature of between 40°F and 50°F and to reopen between 60°F and 70°F. It should be noted the exact temperatures are not significant. It is necessary, however, that the low temperature limit be above freezing. The safety thermostat 48 includes a first switch 50 which is in series with the mode control relay 32 and a second switch 52 which is in parallel with the heating switch 20 to insure energization of the heater 14 in the event heating switch 20 was open. The closing of switch 50 at the preselected low temperatures energizes mode control relay 32 which moves switch 34 from the operational mode position shown to the heat mode shown in dotted lines in FIG. 1. As seen in the heat mode, switch 44 is open thereby de-energizing relay 42 causing switch 46 to close and restore power to the unit independent of the remote control system. Further the switch of mode control switch 34 causes the zone unit to go automatically from a normal operating mode whether it was heating or cooling at the time the unit was turned off from the central point to a heating mode. To this end switch 38 opens to disable the heating fan circuit and switch 36 opens to disclose the cooling fan circuit. While switch 38 moves away from contact 40 it engages contact 54 to establish a circuit to fan 12 to insure operation of fan 12 independent of fan switches 18 and 22.

Figure 2:
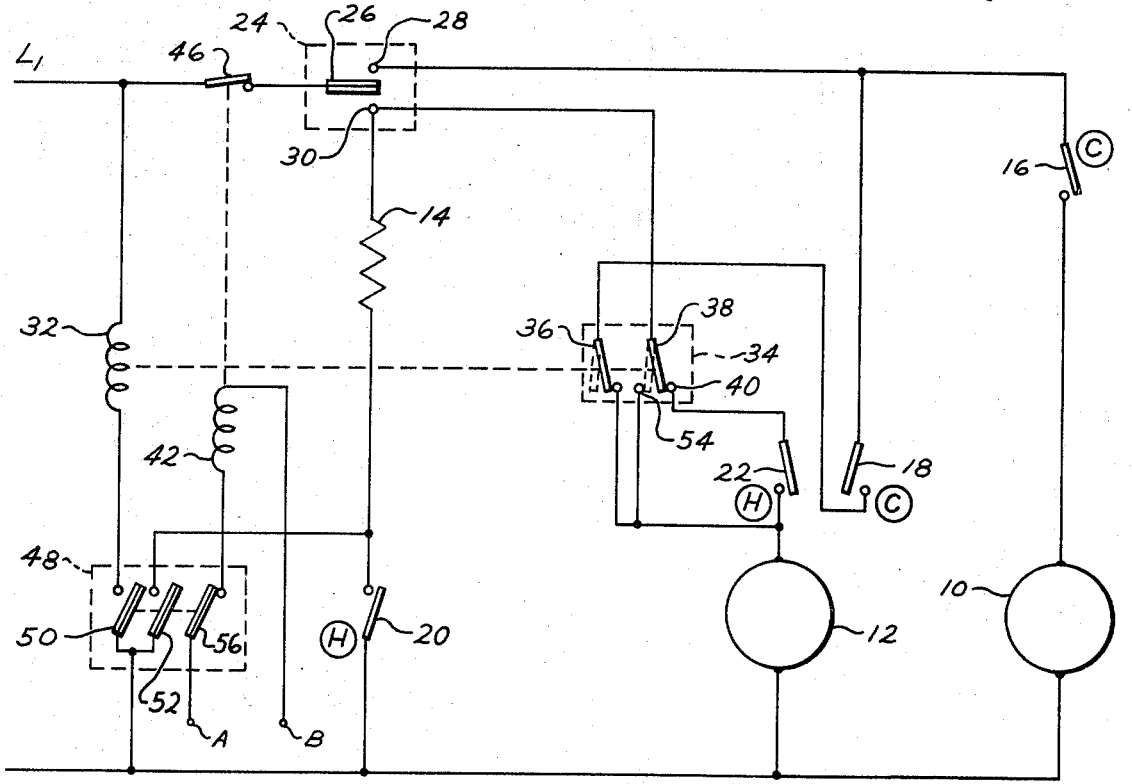
FIG. 2 is a circuit similar to the one shown in FIG. 1 illustrating a second embodiment of the present invention.

Referring now to FIG. 2, there is shown a second embodiment of the invention wherein parts identical to those of the embodiment of FIG. 1 are shown by the same numerals. In this embodiment the remote control 42 is in series with a normally closed third switch 56 of the safety thermostat 48. As switches 50 and 52 of thermostat 48 close to place the unit in the heat mode, switch 56 opens to de-energize relay 42 and close its associated switch 46 to reconnect the unit to the power supply thereby overriding the remote control system.

In summary, the safety freeze control thermostat in both embodiments simultaneously overrides the remote control system while automatically covering operation of the unit in a safety heat mode independent of the operation mode the unit may have been in.

I claim:

1. Safety control apparatus for a remotely controlled zone unit having heating and cooling system including a fan for circulating enclosure air comprising:
    mode control means including switch means for placing said zone system in condition to operate either in a normal heating or cooling operating mode or in a safety heating mode;
    remote control input means responsive to a remote control source for turning said zone unit on and off; and
    safety thermostat switch means responsive to a predetermined temperature for simultaneously conditioning said mode control means to operate said system in the safety heat mode and to override the operation of the remote control input means and said normal operating mode to automatically energize said heating system.

2. The invention of claim 1 wherein said safety thermostat switch means includes a first switch connected in series with said mode control means, and a second switch connected in series with heating means in said heating system.

3. The invention of claim 2 wherein said remote control input means is serially connected through a first switch means in said mode control means.

4. The invention of claim 2 wherein said remote control input means is serially connected through a third switch in said safety thermostat switch means.

5. The invention of claim 3 wherein said mode control switch means includes a second switch means connected in series with a cooling system switch and said fan, a third switch connected in series with a heating system switch and said fan, one of said second or third switch means having a second contact connected in series with said fan independent of said cooling and heating system switches.

6. The invention of claim 4 wherein said mode control switch means includes a first switch connected in series with a cooling system switch and said fan, a second switch connected in series with a heating system switch and said fan, one of said first or second switch having a second contact connected in series with said fan independent of said cooling and heating system switches.

7. The invention of claim 5 wherein said remote control input means includes a relay switch means series connected to said first switch means in said mode control means and switch means associated with said relay for turning said unit on and off.

8. The invention of claim 6 wherein said remote control input means includes a relay series connected to said third switch in said safety thermostat switch means and switch means associated with said relay for turning said unit on and off.

* * * * *